United States Patent [19]

Flanagan et al.

[11] Patent Number: 4,658,348

[45] Date of Patent: Apr. 14, 1987

[54] METHOD AND APPARATUS FOR CONFIGURING A CONTROLLER

[75] Inventors: Allan L. Flanagan, Attleboro, Mass.; David A. Richardson, East Greenwich, R.I.

[73] Assignee: The Foxboro Company, Foxboro, Mass.

[21] Appl. No.: 764,271

[22] Filed: Aug. 12, 1985

[51] Int. Cl.⁴ ............................................. G06F 15/46
[52] U.S. Cl. .................................. 364/146; 364/189; 364/513
[58] Field of Search ............................... 364/140–147, 364/148, 194, 513, 188, 189, 171, 200 MS File, 900 MS File; 382/14, 15

[56] References Cited

U.S. PATENT DOCUMENTS

| 3,716,840 | 2/1973 | Masten et al. | 364/200 |
| 3,971,000 | 7/1976 | Cromwell | 364/189 X |
| 4,254,474 | 3/1981 | Cooper et al. | 364/900 |
| 4,303,973 | 12/1981 | Williamson, Jr. et al. | 364/189 X |
| 4,443,861 | 4/1984 | Slater | 364/189 X |
| 4,566,061 | 1/1986 | Ogden et al. | 364/189 X |

Primary Examiner—Joseph Ruggiero
Attorney, Agent, or Firm—William E. Meyer; Jack H. Wu; Terrence Martin

[57] ABSTRACT

Reading values, setting values and setting configuration options within a complex programmable controller is simplified, by chaining all user interaction points into a single path, cross linking portions of the main path into subpaths and providing keys that step the user according to his selection along the main path, along the subpaths, and between the subpaths. A two part display indicating the general and specific positions clarify the locations and the options available.

20 Claims, 3 Drawing Figures

METHOD AND APPARATUS FOR CONFIGURING A CONTROLLER

TECHNICAL FIELD

The invention generally relates to programmable devices and more particularly is concerned with a method and apparatus for configuring a controller by hand.

BACKGROUND ART

Process controllers generally consist of a series of input ports, a control mechanism, and a series of output ports. Historically process controls were pneumatic devices where the inputs and outputs were pneumatic pressures, and the control element was a mechanical force balancing device. The operator tuned the device by turning a screw to position a lever, to tension a spring or to perform a similar mechanical adjustment.

Pneumatic devices are being replaced by simple electrical devices and more recently by devices that include small computers. The latter offer great accuracy, and are adaptable to a wide variety of applications. By electing among the various program features, the same device can be configured for use in many more situations, or be quickly reconfigured for different conditions in the same situation. Adding additional computational ability then extends the utility of the device at little per unit cost.

The addition of computing components to controllers is not without problems. As the list of configurable features become more extensive, the operator is required to knowledgeably select from the list of options. The lack of self-obviousness is then an emerging difficulty in configurable controllers. One awkward solution is for the operator to carry an instruction book with him.

Another difficulty is the mechanical communication between the operator and the controller. The controller has become a computer, requiring a list of data inputs to set its configuration. One solution has been to add a keyboard to the controller itself. The operator uses the general keyboard to enter values and to select options offered by the device. The number of keys on such keyboards can be quite extensive, verging on that of a typical computer terminal. An alternative solution is to provide a series of specialized keys for entering particular items. In either case, the area of the face of a controller in a device rack is limited which in turn limits the number of conveniently available keys. Some controllers overcome the area limitation by placing the keyboards on the side of the device. The controller is then slid partially out from the rack, exposing the keyboard for command entry. Another solution has been to place a door on the controller's faceplate behind which additional keys are positioned. Extensive keybords are expensive, take up space, and by themselves do not constitute a convenient solution to the on-site configuration problem.

A solution to the mounted keyboard, is to dismount the keyboard from the controller and place it in a hand-held unit. The operator carries the hand device from place to place and plugs it into a controller to enter device information. The hand-held device is not a fully satisfactory solution. One hand device may be required for each separate controller. The operator is then obligated to remember to carry the device, or devices and possibly an instruction book. Further, a hand-held keyboard of itself is not an adequate solution to the problem of setting up a complex device.

Another solution is to include in the controller a read and display sequence. A series of interaction points for data entry are linked as a chain. The operator presses a button to sequence the device to a point for interaction, reads or sets a value, and then cycles the device back to its beginning state. By returning to the initial entry at the end of the series, the straight chain of entry becomes a ring structure. A ring structure of interaction points allows the operator to make a series of entries and repeat the sequence reading and checking his entries. In an initial set up, usually all of the options must be set, in which case a single chain or ring type set up procedure is acceptable. The operator does not need to carry an instruction book, or a hand held device, yet a limited number of keys are conveniently present. No expensive or extensive keyboard is required. Only a few keys and a small display are present. However, the operator must repeatedly press one or more faceplate keys to position the device in the command loop.

Controllers are becoming complex, and the number of interaction points is increasing from the approximately just a few steps to a hundred, or more. One problem that occurs is the operator is inconvenienced by the numerous keystrokes required to position the device state in a long list of interaction points. Another problem is the operator may become confused as to what the current interaction point is; what is being entered or how to get to a different interaction point. The confusion is particularly likely where the category of information being entered changes.

Consequently, a need exists for improvements in the field of controller devices having selectable options so that with a limited number of input keys, a quick and self evident set up procedure may be accomplished.

DISCLOSURE OF INVENTION

A method of reading, setting and configuring a controller device having a limited number of keys that variably select interaction points and determine responses while simultaneously actuating displays resolves the difficulties of the prior art. The interaction points are selected by keys that step the controller device along a single main path, or along one of a series of subpaths, or shift between the various subpaths that link the interaction points. Additionally, multiple displays inform the operator of the exact interaction point selected and prompt his response.

Accordingly, the invention relates to apparatus and method for reading, setting and configuring a control device which includes the steps at the user's option of stepping forward or backward through any of a series of subpaths, moving between subpaths, and returning to a first position to read, select or enter information at device interaction points.

BEST MODE FOR CARRYING OUT THE INVENTION

User interaction with a controller may occur at several levels. One level is the normal faceplate operation where current process numbers are displayed, graphically or numerically, alarms are signaled; and, remote or local set point and similar broad function modes are presented. Another level is the reading of specific process or control variables as they are being sensed or are currently set. Another level is the setting of control variables. Setting up a controller entails setting the control parameter goals, ratios and limits. The proportional, integral and derivative factors and the alarm conditions are the typical parameters of concern in setting up a controller.

Lastly there is a configuration level where traditionally the controller wiring is physically restructured. Configuration entails selecting input channels; selecting signal processing parameters including filtering, linearization functions, bias and gain; selecting signal combinations; selecting signal processing parameters including filtering, linearization, bias and gain; directing output signals according to control type definitions including proportional, integral, derivatives or any combination thereof; and directing output signal processing and output channel selection. The configurable controller receives multiple inputs each of which are subject to the functions listed above. The multiplicity of processed input signals may be combined in any of numerous predetermined but selectable patterns, having a multiplicity of possible output signals.

Applicants have made a device where more than 180 values are set in a convenient way by processor control. Selection among the control parameters is accomplished by first locating the parameter entry point, or interaction point and then depending on the particular interaction point, by selecting one of a series of switches, by setting a value of scrolling a counter to the chosen value, or by acknowledging an option in a list as the accepted one.

Figure 1:
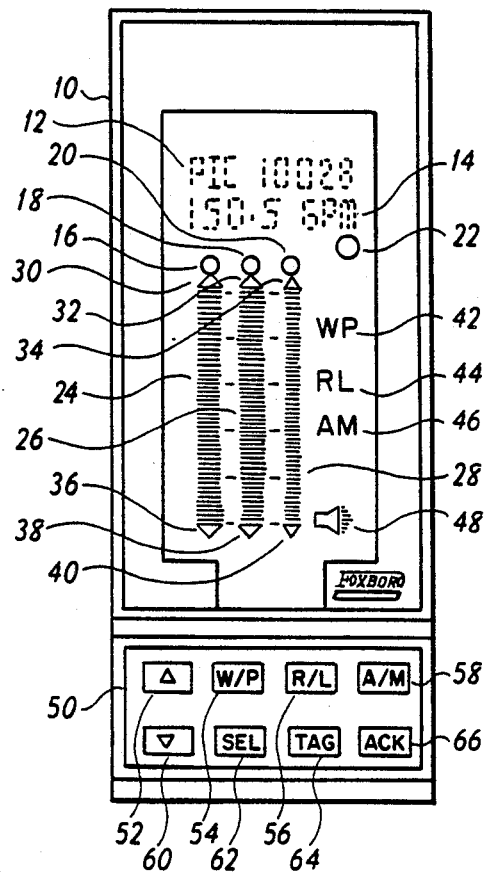
FIG. 1 shows the face of a controller device which includes the present invention.

Turning to FIG. 1 there is shown a faceplate 10 of a controller device using the present invention. The controller shows an upper display line 12, and a lower display line 14 each having nine characters. The upper display 12 shows a label that identifies the process loop being controlled. The loop tag display 12 remains constant during faceplate operation. During faceplate operation, the lower display 14, shows a label, a numeric value or both of an attribute selected by the user and associated with the identified loop. The lower display 14 may then be varied by user selection. Beneath the display lines is a series of single lights called bargraph indicators 16, 18, 20 only one of which is lit at a time. A fourth light in the same row is a controller failure indicator 22. Beneath the bargraph indicators 16, 18, 20 are three vertical graph indicators 24, 26 and 28 that indicate as bargraphs the numeric values. At the upper end of each bargraph is an overrange indicator 30, 32, 34, and at the lower end of each bargraph is an underrange indicator 36, 38, 40. Next to the vertical bargraph indicators is a vertical series of status mode indicators, which are respectively a workstation/panel indicator (W/P) 42, a remote/local indicator (R/L) 44, auto/-manual indicator (A/M) 46 and an alarm indicator 48. Below the bargraph and status indicator area is a keypad 50 having eight keys in two horizontal rows of four keys each. In the first row there is an up arrow key 52, a W/P key 54, a R/L key 56 and an A/M key 58. In the second row there is a down arrow key 60, a SEL key 62, a TAG key 64 and an ACK key 66.

The key functions have two modes. The first mode is the faceplate operation of the controller where the keys all have familiar industry uses. By pressing the W/P key 54, R/L key 56 and A/M key 58 the controller is shifted between several states of operation, and the appropriate corresponding status indicator 42, 44, 46 is lit. The R/L key 56 selects between remote and local set point operation, the A/M key 58 selects between automatic and manual control operation, and the W/P key 54 selects between workstation and panel operation. The function of these three keys does not change, though the keys may be disabled in some modes to avoid inadvertently setting them.

Also shown is a SEL key 62 which in faceplate operation is used to select among the several bargraphs as to which label and numeric value is shown in the character display 14. By pressing the SEL key 62, the current bargraph indicator is turned off and the next indicator turned on. The upper display 12 remains fixed showing a text label of the loop being controlled. The lower display 14 shows the numeric value and relevant engineering units for the indicated bargraph.

In faceplate operation, the ACK key 66 is used in response to an alarm. By pressing the ACK key 66, an alarm condition is acknowledged, stopping the alarm signal 48 from flashing, and causing a label for the source of the alarm to appear in the lower display line 14. Further use of the ACK key calls up any other alarms, if present, until all alarms are acknowledged. The lower display 14 returns to the value as selected by the bargraph indicator when the last alarm is acknowledged.

The up arrow key 52 and down arrow 60 key are used in manual and set point mode to increase (up arrow) or decrease (down arrow) the numeric value shown in the display 14 and indicated by the bargraph indicator 16 or 20 according to the indicated bargraph 24, or 28.

The TAG key's 64 function is to shift back and forth between faceplate operation and a second mode of operation, the read/set mode. Read/set mode is entered when the controller is in the faceplate mode by pressing the TAG key 64. In read/set the ACK 66, SEL 62, up arrow 52 and down arrow 60 keys change function and are used to locate and identify machine states, and to read or reset values found in those positions. The W/P 54, A/M 60 and R/L 56 keys in the preferred embodiment continue to operate as in the faceplate mode, until the configuration branch is entered where the W/P 54, A/M 58 and R/L 56 keys are disabled. The read/set mode will be discussed in greater detail below.

Figure 2:
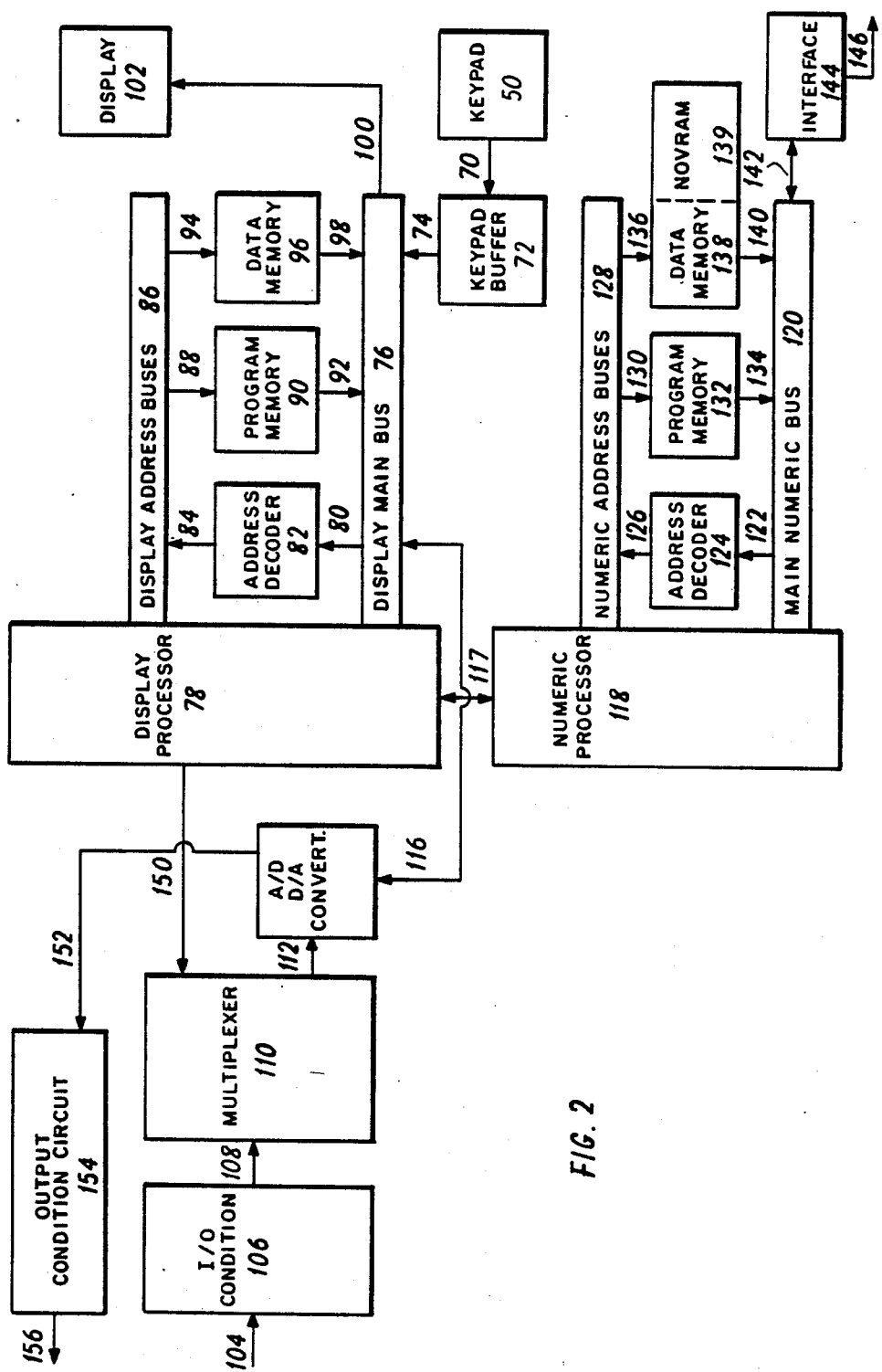
FIG. 2 is a block diagram depicting the preferred embodiment of electronic equipment incorporating the present invention.

FIG. 2 shows a block diagram of an electronic controller device using the preferred embodiment of the invention. Digital electronics is preferred as a best method for producing the firmware features described here. The user communicates through the keypad 50 also depicted in FIG. 1. The keypad is joined by a line 70 to a keypad buffer 72 where the key stroke signals are passed by a line 74 to a main display data bus 76 and on to a display processor 78. The key pad buffer 72 isolates the keys from the main display data bus 76 until the keys are actuated whereupon all eight keys are sensed directly. The display processor 78 issues address commands on the main display data bus 76 which pass via line 80 to an address decoder 82. The address decoder 82 latches the address which is held via a line 84 on several address buses 86 shown generally.

The display processor 78 and the address decoder 82 communicate by the address buses 86 via a line 88 to a program memory 90 comprising read only memory (ROM) to signal transfer of relevant program sections by a line 92 to the main display data bus 76 for use by display processor 78. Additionally, display processor 78 and address decoder 82 communicate by the address buses 86 and a line 94 to a display data memory 96 which holds data values for the current selected controller set up, and received process values. By display processor 78 signalling through the display address buses 86 and line 94, the display data memory 96 passes values by a line 98 to the main display data bus. The data values are then either received by the display processor 78 or passed by a line 100 to a display device 102 including the display lines 12 and 14 and other display features of FIG. 1.

A variety of input lines shown generally by a line 104 provide field signals to a group of associated input signal conditioning circuits 106 generally. Typical field signals include 4-20 ma signals for temperature, pressure and flow measurements issued to sensing devices. Such signal conditioning includes filtering, bias adjustment and other signal processing procedures. The conditioned input signals pass by a number of lines 108 shown generally to an analog multiplexer 110. According to a selection signal received via line 150 from the display processor, the resulting multiplexed signal is transmitted by a line 112 to an analog to digital converter 114 for digital conversion. The analog to digital converter 114 is also used as a digital to analog converter for analog output on line 152. Known methods of successive approximation are used to operate the converter in the two forms. The digital signal is passed through a line 116 to the main display data bus where the signal is read by the display processor 78.

Display processor 78 passes the now digitized field signals from line 116 to a numeric processor 118 connected by a line 117. The numeric processor 118 performs the numerical calculations related to the process under control, according to the set up information. The numeric processor 118 is connected along a main numeric data bus 120 to a line 122 which connects to a numeric address decoder 124. The decoder 124 connects by line 126 to a series of numeric address buses 128 shown generally which also connects to the numeric processor 118. The numeric address buses 128 connect by a line 130 to a program memory 132 which in turn connects to the main numeric data bus 120. The numeric address bus 128 also connects by a line 138 to a numeric data memory 138 which is joined by a line 140 to the main numeric data bus 120. Also connecting to the numeric data bus 120 is a line 142 joining bidirectionally an interface unit 144 for serial communication on a line 146.

One element of the numeric data memory 138 is a non-volatile random access memory device (NOVRAM) 139 such as the INTEL 2004 device. Use of the NOVRAM device allows the numeric memory to survive power failures, and allows the numeric memory to be detached from a first controller and reinserted in a second controller. The NOVRAM is then useful in a memory copying process to set up several controllers with the same numeric memory.

The numeric processor's results are passed back to the display processor 78 on line 117. The display processor 78 in turn passes the output signal via the main display data bus 76 to line 116 to the analog to digital converter 114, now being used as a digital to analog converter. The analog output from converter 114 is passed by a line 152 to an output signal conditioner 154.

In actual construction, additional elements are included that are not shown in FIG. 2, including a power supply, timing signal circuits, reset circuits, and others. The addition of these elements is well within the skill of electronic controller designers.

The controller has two modes of broad operation: faceplate and read/set. In faceplate operation mode the display processor receives input signals from the process environment and passes them directly by line 116 to the numeric processor 118. The numeric processor is configured to operate as firmware according to the current operator selected set up and configuration. The numeric processor 118 processes the input process signals according to the operation set up, and issues output signals to the display processor 78 which passes them on to devices in the process environment on line 152. Typical process devices include such devices as actuated valves, furnace heaters and pumps. The numeric processor also updates memory with the process values, both those received and issued.

Key strokes are passed as individual bits from the keypad 50 via the keypad buffer 72 to the main display data bus 76. The particular bits are passed by the display processor 78 to the numeric processor 118 where the bits are treated as logical conditions for the numeric processor firmware.

By pressing the TAG key the second mode of operation, read/set, is called into action. In read/set mode the numeric processor 118 shifts to a first position of a firmware program to let the user read values, set values, and if elected, to reconfigure the device. Within the read/set mode are numerous machine states where the user may interact with the machine by pressing the ACK, SEL, up arrow and down arrow keys to shift the machine to different states.

In the read portion of read/set mode, the operator can locate and display the current values of inputs, contacts, alarm and limit settings. In addition, the present operating controller configuration can be read in its entirety. In the set portion of the read/set mode, the operator can locate and alter the current controller parameters, alarms and limit settings constituting the current control set up.

The configure mode is a subsection of the set portion of read/set. In configure mode, the user can locate and alter input and output signal controls. Previously, signal processing control methods have been hard wired into control devices. An input would be wired to a specific terminal, so as to assure its proper process connection. Physical settings and connections were made in the process device to control the signal according a fixed path through a series of single response components, to achieve the elected results. In the present embodiment, the user in configure mode, directs by processor action, the input signal path through signal processing, signal combination, and output use. Such processor elections include where the signal is read, what filtering bias, gain and other conditioning is performed; how the signal may be combined with other signals.

While in read/set mode except for the configure portion the numeric processor 118 continues to operate as a controller in the same fashion as in faceplate mode by reading the field inputs, calculating, and issuing the output signals according to the set up that existed prior to pressing the TAG key. The controller does cease to act as a process responsive controller when the configure mode is entered. The controller continues to issue as a fixed signal the last output prior to the configure mode entry. Improper signals might otherwise be issued during the configuration process. The W/P key 54, R/L key 56, and A/M key 58 are also disabled during configure mode for the same reasons. The online control aspect of the numeric processor 118 is unaffected by the majority of the user's read/set mode activity. Only in configure mode is the actual control signal affected.

When a key is stroked on the keypad, the particular key is identified numerically as a particular bit in a data word. The result is passed by the keypad buffer 72 to the main data display bus 76. Periodically the display processor 78 examines the keypad buffer 72 for any key stroke numbers. The key stroke signals are passed by line 117 to numeric processor 118 as logical conditions. Corresponding to each key stroke there are functions that the processor executes. Upon stroking the TAG key, the functions of the ACK, SEL, up arrow, and down arrow are altered as the processor shifts from normal faceplate mode to read/set mode. The display processor 78 continues to monitor the keypad 72 for key strokes.

Figure 3:
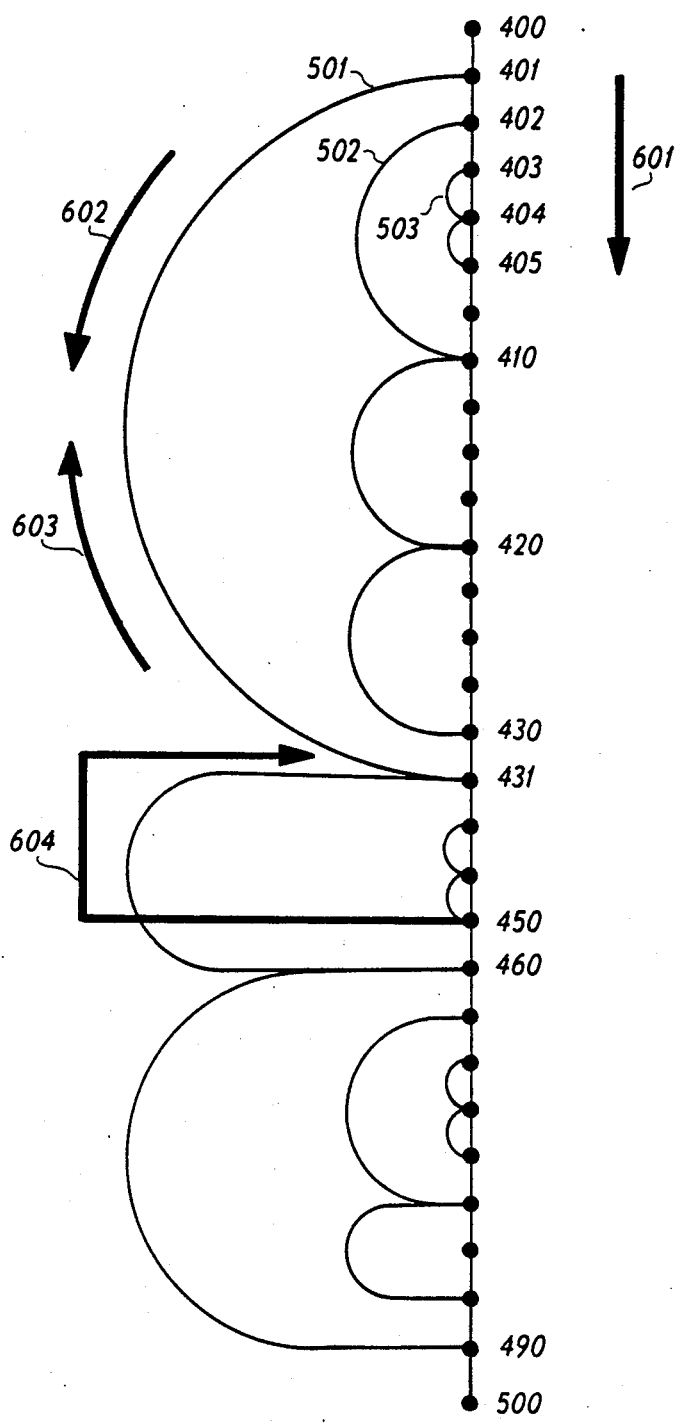
FIG. 3 is a tree structure graph depicting the pattern of machine states in the preferred embodiment of the invention.

Turning to FIG. 3, there is shown a graph of ordered machine states depicted as points, linked by allowable transitions between machine states shown as lines. A main path starting at point 400 vertically links all the points down to point 500. Several subpaths of connected machine states branch from the main path linking subsets of the points along the main path. A first subpath 501 links points 401, 431, 460, and 490; while a second subpath 502 links points 402, 410, 420 and 430, and a third subpath links points 403, 404 and 405. No subpath point is included on two or more subpaths. Every subpath has a first subset point that is highest along the main path, as for example point 401 on the first subpath 501 or point 402 on the second subpath 502. The subpaths shown are arranged by levels, where a higher level subpath has a first subpath point prior in sequence along the main path of the first subpath point of a lower level subpath. Further all the subset points of a lower subpath, eg. points 403, 404, 405 of the third subpath 503, are between a segment of two sequential points, eg. points 402 and 410, along the next higher subpath, eg. the second subpath 502. Further still each subpath is ordered by the same order that the subpath points have along the main path, that is no subpath connects a later point to an earlier point. The first subpath (e.g. 501) is considered the next higher subpath of the second subpath, (e.g. 502) and conversely the second subpath (e.g. 502) is considered the next lower subpath of the first subpath (e.g. 501).

Four arrows indicate possible directions of movement along the graph that corresponds to allowable transitions between machine states. A downward pointing arrow 601 adjacent the main path indicates sequential stepping along the main path. An arced downward pointing arrow 602 adjacent the first subpath indicates forward stepping along a subpath from one main path point forward to another point, such as from point 401 to point 431. An arced upward pointing arrow 603 adjacent the first subpath indicates backward stepping along a subpath from one main path point backward to another point, such as from point 431 to point 401.

The fourth arrow is a backward pointing arrow 604 linking a lower subpath point in a mainpath point of a higher subpath one step above at least the first subset point of the lower subpath. The arrow indicates the allowed shifting from any lower subpath position to a point on a different higher subpath position one point higher than the first subset point of the lower subpath. In this way, position may be shifted from any place on a subpath, up to a higher point on a different and higher subpath.

The graph of FIG. 3 demonstrates the categorization of controller subjects by category levels. Each subpath represents a subject category, eg. read, and set. The lower level subpaths included within a higher level subpath segment correspond to the subcategories within the larger category, eg. the configure section within the set portion. The graph displays the pattern of machine state relations that has been found particularly useful.

The four arrows of FIG. 3 correspond to the four key functions ACK 66, down arrow 60, up arrow 52 and SEL 62, as used in the read/set mode.

The TAG key shifts the controller between the faceplate and read/set modes. When the device is in faceplate mode, pressing the TAG key puts one into the read/set mode at the top or beginning of the read/set mode machine state structure. When the device is anywhere in read/set mode, pressing the TAG key 64 ends the read/set mode and returns the device to faceplate operation. The TAG key has no other function than to shift between faceplate and read/set modes. Upon shifting into the read/set mode by pressing the TAG key, the ACK key 66, the SEL key 62, the up arrow key 52 and the down arrow key 60 all change from their faceplate mode functions to machine state positioning functions in the read/set mode. The machine state positioning functions correspond to the functions of arrows 601, 602, 603 and 604 of FIG. 3.

Entry into read/set mode leaves the program at the first, or highest point along the main path. The user selects either first a subpath to read values, or a second subpath to set values. The read mode tracks the controller configuration as currently set up, but allows no changes to the configured values. The set mode allows each value to be accessed and altered, and special access lets the user enter the configuration branch where the controller configuration may be set.

In the read/set mode, the ACK key 66 is used to move down through the structure of machine states and corresponds to function arrow 601 of FIG. 3. Successive uses of the ACK key sequential advances the machine down through the structure of machine states or interaction points first to finer categories and then to higher categories and so on until all the positions available as determined in configuration are passed through. In this way, successive use of the ACK key 66 leads one through all the previously configured machine states of the structure.

The SEL key 62 returns the position up the to the next higher point of the subpath having one higher level than the first subset point of the current subpath. The SEL key then corresponds to the arrow function 604 of FIG. 3. The SEL key 62 function is not exactly the inverse of the ACK key 66. Successive use of the SEL key 62 moves the position up through higher categories to the first position, and then to the faceplate operations mode. One exception to the SEL key 62 function is to accommodate proper exit from a secure subpath area. A password test may be required before an operator may access a particular section of machine states. If the operator is unable to provide the password, a path branch shifts the machine past the protected sections. If the correct password is presented, the secure area may be entered. The applicants use a password protection for the configure portion of the read/set mode. Upon exit from the protected area, a new password is required, or a confirmation of the activities performed within the protected area may be required. In either case, operation of the SEL key should include means for passing through the confirmation procedures.

The down arrow key 60 steps the machine through all the subpath options for the current subpath. The down arrow key 60 then corresponds to the function arrow 602 of FIG. 3. Each subpath point is jumped to in sequence until the last point for the current subpath is reached. The down arrow key 60 function is then stopped, signaling to the operator that all available machine states for the current subpath have been displayed. Note that when the machine state is at a lowest level category, there are no lower subpaths to select from at that level. The down arrow key 60 then cannot advance the machine state along a nonexistent subpath. In the read portion of the read/set mode, the down arrow key 60 then has no effect. In the set portion of the read/set mode, when the lowest category level is reached, the down arrow key 60 is used to scroll the configured value. When the lowest category is numeric, the down arrow decreases the value. Where the lowest category is a switch condition (on or off) the switch is set off. The lowest category level may also comprise the elements of a list. By cycling through the list by using the ACK key or down arrow key, the item of choice may be located, and then selected by using the SEL key to shift out of the subpath. List selection is particularly useful in configuration mode.

The up arrow key 52 is a reverse key for the down arrow key 60 and corresponds to the function arrow 603 of FIG. 3. Where the down arrow key 60 will step the position one direction through available subpath positions, the up arrow key 52 will cycle the position in the opposite direction among the same available machine states along the current subpaths. Where the down arrow key 60 is used in the set portion of the read/set mode to decrease a value, the up arrow key 52 is used to increase the value. Where the down arrow key 60 sets a switch, the up arrow key 52 sets the switch in the opposite position. The up arrow key 52 is then a reverse key of the down arrow key 60.

It is convenient to continuously inform the operator as to the current machine state. Associated with every position along the main path is a label. As the controller is stepped along the main path the label associated with the current position is displayed in the lower display line. In the upper display, the label associated with the next higher point along the next higher subpath is shown. In this way the user is given a category label in the upper display, and a particular label or value in the lower display.

Sequencing through the available machine states for a particular subpath, the operator sees the upper display 12 remain fixed showing the higher category identifier, while the lower category labels change in the lower display 14. Upon selecting a lower category, the lower category label moves from the lower display 14 to the upper display 12 where it becomes the higher category identifier. The label of the first subset point of the new subpath appears in the lower display 14. Upon reaching a lowest category, the machine state label for that lowest category appears in the upper display 12, and a value appears in the lower display 14.

The selecting of a particular value for use in a set up is accomplished by passing through the appropriate higher categories until the lowest level subpath for the subject is reached. At the lowest level of subpath, e.g. subpath 503, as shown in FIG. 3, the subpath parallels the main path. Use of the ACK key appears to be equivalent to use of the down arrow key. Where the elements of such a lowest level subpath, e.g. 503, correspond to items in a list, an element may be selected by using the down arrow key, and up arrow key to locate the list item desired.

Subsequently, using only the ACK key to exit from the subpath, causes the list item to be selected. Similarly, if a numeric value is to be set, the user at the lowest subpath level may locate the value category, then use the up arrow and down arrow keys to scroll the numeric value to the desired point, and then set that desired value by using the ACK key to leave the subpath.

While there have been shown and described what are at present considered to be the preferred embodiments of the invention, it will be apparent to those skilled in the art that various changes and modifications can be made herein without departing from the scope of the invention defined by the appended claims. For example:

One variation is to link the lowest or last point on a subpath back to the first point on the subpath thereby ordering the subpath points as a ring. By stepping forward, all the machine state options for a category are presented, and no machine states not associated with that category are presented. In the preferred embodiment, the operator is stopped from stepping forward upon reaching the last available machine state along a subpath. Stopping forward stepping conveniently signals that all the available options within the category have been presented, and that the operator should make a choice from those presented. Thus all the available machine states on that subpath are displayed without confusingly passing on to another category, or recycling among previously presented items. Stepping backwards allows the operator to relocate a selection if it is passed over.

The method described uses four keys, that provide location movements in the structure. These keys correspond broadly to up and down movement along the structure, and right and left movements across the structure. The location actions can be completed with three keys, corresponding to up, right and reverse where reverse acts to change the up key to a down key, and to change the right key to a left key. By pressing reverse, the next key pressed, up or right, will be reversed in function until reversed again. The savings of one key does not justify the confusion introduced by fluctuating key meanings.

Another useful variation, and one that the applicants have implemented in reguard to the configure portion of read/set mode is to block access to subpaths that are logically inconsistent with previously selected conditions. The particular implementation bars over allocation of configuration resources. An operator is then prohibited from using an input line as both a controlled and a controlling value. The particular logic for path blocking depends on the specific nature of the input, processing and output procedures.

Additional keys may be added for particular functions. For example the structure may be separated according to its initial or major subpaths and each major subpath associated with a separate key. Separate keys would then be associated with separate structures, for example the read, set and configure modes described. Separate keys might also be associated with a preset group of values or configurations, thereby allowing quick insertion of a known set up. Keys may also be established to mark particular machine states, allowing direct jumping between marked positions.

The ordering of subpaths may take many other forms. The described ordering is preferred as it limits ambiguities. For example, the paths may link later states to prior states along the main path, or link states within a subpath segment to points outside that segment. More generally, for each additional locating key, an additional locating direction can be added to the subpath system.

Additional lines of display may be added to increase the user's understanding.

What is claimed is:

1. A controller device having apparatus for user activated selection among machine states comprising:
   (A) an electronic device having a multiplicity of machine states for user interaction said machine states called user interaction points, serially ordered from a first highest point to a last lowest point in a single main path linking all the interaction points, and at least two of said interaction points forming at least one subset of said interaction points serially ordered and linked from a first highest subset point to a last subpoint as a subpath; and
   (B) electronic means
      (i) responsive to activation of a first key by a user for stepping said electronic device from a current interaction point to a next interaction point along said main path, and
      (ii) responsive to activation of a second key by a user for stepping said processor from a subpath interaction point to a subset interaction point along the subpath linking the subset of subpath interaction points.

2. The apparatus of claim 1, wherein the electronic means is further responsive to activation of a third key by a user for stepping said electronic device serially backward along a subpath from a current subpath interaction point to a next previous interaction point along the current subpath.

3. The apparatus of claim 1, wherein the electronic means is further responsive to activation of a fourth key by a user for stepping said electronic device from a current first subpath interaction point to a first subpath point along a second subpath.

4. The apparatus of claim 1, wherein the order of machine states in a subset forming a subpath has the same order that the machine states have along the main path.

5. The apparatus of claim 1, wherein no machine state is included in more than one subset forming a subpath.

6. The apparatus of claim 1, wherein a first subset of machine states forming a first subpath along the main path are included between two sequential subset points of a second subset of machine states forming a second subpath, said two sequential subset points, linking a machine state higher than the highest point of the first subpath and a lower point lower than the lowest point of the first subpath.

7. The apparatus of claim 1, wherein the first point of a first subpath is preceded by one step on the main path by a subset point of a second subset.

8. The apparatus of claim 1, wherein the electronic device comprises a substantially digital electronic device.

9. The apparatus of claim 1, further including display means indicating prompting information to an operator.

10. The apparatus of claim 9, wherein the display means comprises at least sixteen characters.

11. The apparatus of claim 9, wherein the display includes a label associated with the current machine state along the main path.

12. The apparatus of claim 9, wherein the display includes a label associated with the first subpath point one machine state higher along the main path than the first subpath point of a current subpath.

13. The apparatus of claim 1, further including a fifth key communicating to said program device for shifting to a set interaction point.

14. In a controller device having a multiplicity of selectable machine states a method of locating interaction points comprising the steps of:
   (A) ordering all interaction points along a main path,
   (B) crosslinking subsets of interaction points along subpaths such that no subset intersects with any other subset,
   (C) stepping along a single main path linking all the machine states, and
   (D) stepping along a current subpath linking a subset of the machine states along the main path.

15. The method of claim 14, wherein no interaction point is included more than once along the main path.

16. The method in claim claim 14, wherein every interaction point is a member of a subpath.

17. A control device having apparatus for selecting among user options comprising:
   (A) a electonic device having machine states called user interaction points serially ordered in a single main path linking all the interaction points, wherein no interaction point is included more than once along the main path, wherein every interaction point is a member of a subpath, and
   (B) electronic means
      (i) responsive to activation of a first key by a user for stepping said electronic device from a current interaction point to a next interaction point along said main path,
      (ii) responsive to activation of a second key by a user for stepping said electronic device from a current subpath interaction point to a next subpath interaction point along a current subpath linking an ordered subset of the interaction points,
      (iii) responsive to actuation of a third key stepping said processor backward from a current interaction point to next previous interaction point along the current subpath,
      (iv) responsive to actuation of a fourth key stepping said processor from the current subpath to a first point along a different subpath, and
      (v) a fifth key communicating to said program device for shifting to a set interaction point.

18. The apparatus of claim 17, further including a display indicating the current machine state.

19. The apparatus of claim 18, further including a second display indicating the current subpath.

20. The method of claim 14, further including the steps of displaying a label associated with the current interaction point, and displaying a label associated with the current subpath.

* * * * *